United States Patent
Guo et al.

(10) Patent No.: US 9,800,870 B2
(45) Date of Patent: Oct. 24, 2017

(54) LINE BUFFER REDUCTION FOR SHORT DISTANCE INTRA-PREDICTION

(75) Inventors: Liwei Guo, San Diego, CA (US); Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 13/613,382

(22) Filed: Sep. 13, 2012

(65) Prior Publication Data

US 2013/0070848 A1 Mar. 21, 2013

Related U.S. Application Data

(60) Provisional application No. 61/535,797, filed on Sep. 16, 2011, provisional application No. 61/555,354, filed on Nov. 3, 2011.

(51) Int. Cl.
| | |
|---|---|
| H04N 7/32 | (2006.01) |
| H04N 19/13 | (2014.01) |
| H04N 19/159 | (2014.01) |
| H04N 19/176 | (2014.01) |
| H04N 19/46 | (2014.01) |
| H04N 19/91 | (2014.01) |
| H04N 19/61 | (2014.01) |

(52) U.S. Cl.
CPC ........... *H04N 19/13* (2014.11); *H04N 19/159* (2014.11); *H04N 19/176* (2014.11); *H04N 19/46* (2014.11); *H04N 19/91* (2014.11); *H04N 19/61* (2014.11)

(58) Field of Classification Search
None
See application file for complete search history.

(56) References Cited

U.S. PATENT DOCUMENTS

2006/0251330 A1 11/2006 Toth et al.
2007/0223579 A1 9/2007 Bao
(Continued)

FOREIGN PATENT DOCUMENTS

CN 1794818 A 6/2006
CN 1857001 A 11/2006
(Continued)

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.
(Continued)

*Primary Examiner* — Jeremaiah C Hallenbeck-Huber
*Assistant Examiner* — Stefan Gadomski

(57) ABSTRACT

A video coder, such as a video encoder or a video decoder, identifies an entropy coding context in a set of one or more entropy coding contexts. The video coder identifies the entropy coding context without reference to a neighboring coding unit that is above a current coding unit in a current picture. The video coder then entropy codes a short distance intra-prediction (SDIP) syntax element of a coding unit (CU) using the identified entropy coding context. The SDIP syntax element at least partially defines a mode by which the CU is partitioned into a set of one or more transform units.

17 Claims, 9 Drawing Sheets

(56) References Cited

U.S. PATENT DOCUMENTS

| | | | |
|---|---|---|---|
| 2009/0238265 A1* | 9/2009 | Yoshikawa | H04N 19/176 375/240.03 |
| 2011/0038412 A1 | 2/2011 | Jung et al. | |
| 2011/0096834 A1* | 4/2011 | Cheon | H04N 19/119 375/240.12 |
| 2011/0176615 A1 | 7/2011 | Lee et al. | |
| 2011/0188572 A1 | 8/2011 | Min et al. | |
| 2011/0243226 A1 | 10/2011 | Choi et al. | |
| 2012/0008683 A1* | 1/2012 | Karczewicz | H04N 19/159 375/240.12 |
| 2012/0140813 A1* | 6/2012 | Sole Rojals | H03M 7/4018 375/240.02 |
| 2012/0163456 A1* | 6/2012 | Coban | H04N 19/176 375/240.13 |
| 2012/0195377 A1* | 8/2012 | Auyeung | H04N 19/176 375/240.12 |
| 2012/0230403 A1* | 9/2012 | Liu | H04N 19/176 375/240.12 |
| 2012/0281928 A1* | 11/2012 | Cohen et al. | 382/240 |
| 2013/0101032 A1* | 4/2013 | Wittmann et al. | 375/240.12 |
| 2013/0315300 A1* | 11/2013 | Lee | H04N 19/176 375/240.02 |
| 2013/0329784 A1* | 12/2013 | Chuang | H04N 19/102 375/240.02 |
| 2014/0119439 A1* | 5/2014 | Guo | H04N 19/70 375/240.12 |
| 2015/0189320 A1 | 7/2015 | Min et al. | |

FOREIGN PATENT DOCUMENTS

| | | |
|---|---|---|
| CN | 101411196 A | 4/2009 |
| KR | 20110090065 A | 8/2011 |
| WO | 2007112417 | 10/2007 |
| WO | 2012167119 A1 | 12/2012 |

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Cao, et al., "CE6.b1 Report on Short Distance Intra Prediction Method," JCTVC-E278, Joint Collaborative Team on Video Coding (JCTVC-E278) of ITU-T SG16 WP3 and ISO/IEC JTC1/SC29/WG11, 5th Meeting: Geneva, Mar. 16-23, 2011, 7 pp.

Chen, et al., "Simplified context model selection for block level Syntax Coding", JCT-VC Meeting; MPEG Meeting; Torino; (Joint Collboborative Team on Video Coding of ISO/IEC JTC1/SC29/WG11 and ITU-TSG.16), No. JCTVC-F497, XP030049490, 8 pp.

Chien et al., "Memory and Parsing Friendly CABAC Context", JCT-VC Meeting, MPEG Meeting, Jul. 14, 2011-Jul. 22, 2011, Torino, (Joint Collaborative Team on Video Coding of ISO/IEC JTC1/SC29/WG11 and ITU-T SG.16 ), URL: http://wftp3.itu.int/av-arch/jctvc-site/No. JCTVC-F606, XP030009629, 8 pp.

Guo, et al., "Non-CE6: Line buffer reduction for CABAC context of SDIP syntax", JCT-VC Meeting; Geneva; (Joint Collboborative Team on Video Coding of ISO/IEC JTC1/SC29/WG11 and ITU-TSG.16), No. JCTVC-G754, Nov. 9, 2011, XP030110738, 7 pp.

Huwaei, "Integration of E278 to HM-3.0-dev-sdip branch", JCTVC HEVC Test Model (HM) code Repository, vol. HM-3.0, No. Changeset 858, May 5, 2011, XP002685805, 9 pp.

International Preliminary Report on Patentability—PCT/US2012/055442, The International Bureau of WIPO—Geneva, Switzerland, Jan. 15, 2014, 8 pp.

International Search Report and Written Opinion—PCT/US2012/055442—ISA/EPO—dated Nov. 9, 2012, 15 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Peng, et al., "Line-based Image Coding using Adaptive Prediction Filters", IEEE International Symposium on circuits and systems. ISCAS 2010, Paris, France, May 30, 2010 (May 30, 2010), XP031724805, pp. 4221-4224.

Sasai, et al., "Modified Context Derivation for Complexity reduction", JCT-VC Meeting; MPEG Meeting; Torino; (Joint Collboborative Team on Video Coding of ISO/IEC JTC1/SC29/WG11 and ITU-TSG.16), No. JCTVC-F429, Jul. 21, 2011, XP030049421, 18 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/055442, dated Aug. 20, 2013, 5 pp.

Cao, et al., "CE6.b Report on Short Distance Intra Prediction Method," Joint Collaborative Team on Video Coding (JCT-VC) of ITU-T SG16 WP3 and ISO/IEC JTC1/SC29/WG11, 4th Meeting: Daegu, KR Jan. 20-28, 2011, Document JCTVC-D299, pp. 1-5.

Bossen F.,"Common Test Conditions and Software Reference Configurations," Joint Collaborative Team on Video Coding (JCT-VC), ITU-T SG16 WP3 and ISO/IEC JTC1/SC29/WG1, 6th Meeting: Torino, IT, JCTVC-F900, Jul. 14-22, 2011, 3 pages.

Lim, et al., "Intra prediction mode coding with CAVLC on SDIP", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F111_r2, 6 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Bross et al., "High efficiency video coding (HEVC) text specification draft 7," 9th Meeting: Geneva, CH, Apr. 27-May 7, 2012, (Joint Collaborative Team on Video Coding of ITU-T SG16 WP3 and ISO/IEC JTC1/SC29/WG11); JCTVC-I1003_d5, Jun. 13, 2012, 277 pp.

* cited by examiner

LINE BUFFER REDUCTION FOR SHORT DISTANCE INTRA-PREDICTION

This application claims the benefit of U.S. Provisional Patent Application No. 61/535,797, filed Sep. 16, 2011, and U.S. Provisional Patent Application No. 61/555,354, filed Nov. 3, 2011, the entire content of each of which are incorporated herein by reference.

TECHNICAL FIELD

This disclosure relates to video coding and, in particular, to entropy coding in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive video block for a block to be coded. Residual data represents pixel differences between the original block to be coded and the predictive video block. An inter-coded block is encoded according to a motion vector that points to a block of reference samples forming the predictive video block, and the residual data indicating the difference between the coded block and the predictive video block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for intra prediction in a video coding process. A video coder, such as a video encoder or a video decoder, may identify an entropy coding context in a set of one or more entropy coding contexts. The video coder identifies the entropy coding context without reference to any neighboring coding unit that is above a current coding unit (CU) in a current picture. The video coder may then entropy code a short distance intra-prediction (SDIP) syntax element of the current CU using the identified entropy coding context. The SDIP syntax element at least partially defines a mode by which the current CU is partitioned into a set of one or more prediction units. Identifying an entropy coding context without reference to any neighboring CU that is above the current CU in the current picture may, in some examples, permit an encoder or decoder to avoid buffering information associated with CUs that are positioned above the current CU. The may reduce the complexity of the encoder or decoder.

In one example, this disclosure describes a video coding method comprising identifying, without reference to any neighboring CU that is above a current CU in a current picture, an entropy coding context in a set of one or more entropy coding contexts. The method also comprises entropy coding a SDIP syntax element using the identified entropy coding context, the SDIP syntax element at least partially defining a mode by which the current CU is partitioned into a set of one or more PUs.

In another example, this disclosure describes a video coding apparatus comprising one or more processors configured to identify, without reference to any neighboring CU that is above a current CU in a current picture, an entropy coding context in a set of one or more entropy coding contexts. The one or more processors are also configured to entropy code a SDIP syntax element using the identified entropy coding context, the SDIP syntax element at least partially defining a mode by which the current CU is partitioned into a set of one or more PUs.

In another example, this disclosure describes a video coding apparatus comprising means for identifying, without reference to any neighboring CU that is above a current CU in a current picture, an entropy coding context in a set of one or more entropy coding contexts. The video coding apparatus also comprises means for entropy coding a SDIP syntax element using the identified entropy coding context, the SDIP syntax element at least partially defining a mode by which the current CU is partitioned into a set of one or more PUs.

In another example, this disclosure describes a computer-readable storage medium comprising instructions that, when executed, cause one or more processors of a device for video coding to identify, without reference to any neighboring CU that is above a current CU in a current picture, an entropy coding context in a set of one or more entropy coding contexts. The instructions also cause the one or more processors to entropy code a SDIP syntax element using the identified entropy coding context, the SDIP syntax element at least partially defining a mode by which the current CU is partitioned into a set of one or more PUs.

The details of one or more examples are set forth in the accompanying drawings and the description below. Other features, objects, and advantages will be apparent from the description, drawings, and claims.

DETAILED DESCRIPTION

Figure 1:
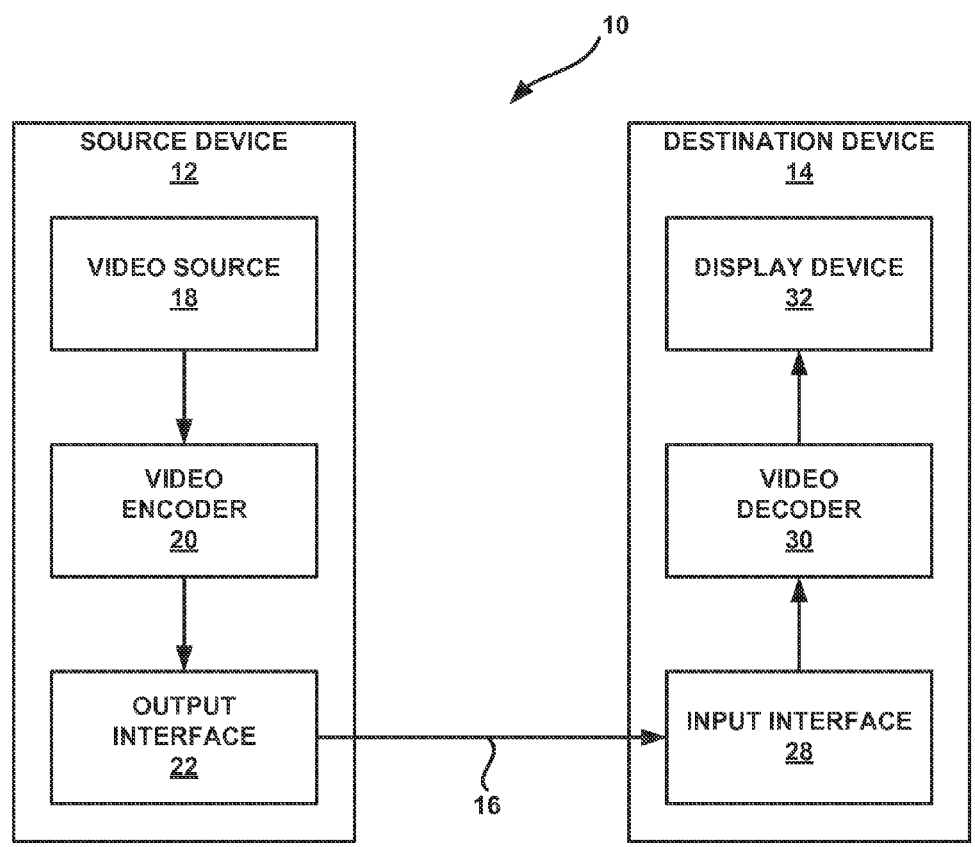
FIG. 1 is a block diagram that illustrates an example video coding system that may utilize one or more of the techniques described in this disclosure.

When a video coder, such as a video encoder or a video decoder, codes a coding unit (CU) of video data, the video coder may partition the CU into one or more prediction units (PUs) according to a partitioning mode. For ease of explanation, this disclosure may refer to the CU that a video coder is currently coding as the current CU. Similarly, this disclosure may refer to a picture that a video coder is currently coding as the current picture. For instance, if the video encoder is using intra prediction to code the current CU, the video coder may partition the current CU into one or more PUs according to a 2N×2N partitioning mode, an N×N partitioning mode, 2N×hN partitioning mode, or an hN×2N partitioning mode. The 2N×hN partitioning mode and the hN×2N partitioning mode may be referred to as short distance intra prediction (SDIP) partitioning modes.

When the video coder partitions the current CU according to the 2N×2N partitioning mode, the video coder does not partition the current CU. Rather, when the video coder partitions the current CU according to the 2N×2N partitioning mode, there is only a single PU associated with the current CU. When the video coder partitions the current CU according to the N×N partitioning mode, the video coder generates four square-shaped PUs associated with the current CU. When the video coder partitions the current CU according to a 2N×hN partitioning mode, the video coder may generate a plurality of rectangle-shaped, horizontally-oriented PUs associated with the current CU. When the video coder partitions the current CU according to an hN×2N partitioning mode, the video coder may generate a plurality of rectangle-shaped vertically-oriented PUs associated with the current CU.

One or more SDIP syntax elements may define the mode by which the current CU is partitioned into PUs when the video coder uses intra prediction to code the current CU. For example, the SDIP syntax elements of the current CU may include a SDIP flag and a SDIP direction flag. A first value (e.g., 0) of the SDIP flag may indicate that the current CU is partitioned into one or more square-shaped PUs. A second value (e.g., 1) of the SDIP flag may indicate that the current CU is partitioned into a plurality of rectangle-shaped PUs. A first value (e.g., 0) of the SDIP direction flag may indicate that the current CU is partitioned into a plurality of vertically-oriented rectangle-shaped PUs. A second value (e.g. 1) of the SDIP direction flag may indicate that the current CU is partitioned into a plurality of horizontally-oriented rectangle-shaped PUs.

In order to reduce the number of bits used to represent the SDIP syntax elements, a video encoder may perform one or more entropy encoding operations, such as context adaptive binary arithmetic coding (CABAC) encoding operations, on the SDIP syntax elements. The video encoder may generate a bitstream that includes an encoded representation of the SDIP syntax elements. A video decoder may perform one or more entropy decoding operations when parsing the SDIP syntax elements from the bitstream.

To perform an entropy coding operation (i.e., an entropy encoding operation or an entropy decoding operation) on a SDIP syntax element, a video coder may identify an entropy coding context. The entropy coding context may indicate predefined context-dependent data that a video coder may use when performing an entropy coding operation. For example, entropy coding contexts for CABAC may indicate probabilities of coding particular bits. For example, one entropy coding context may indicate a 0.6 probability of coding a 0-valued bit and a 0.4 probability of coding a 1-valued bit. In this example, another entropy coding context may indicate a 0.7 probability of coding a 0-valued bit and a 0.3 probability of coding a 1-valued bit.

The video coder may then use the identified entropy coding context to entropy code the SDIP element. Some video coders may identify the entropy coding context based on information associated with CUs that are above the current CU in the current picture. To support selection of the entropy coding context in this way, the video coder may store the information, such as SDIP syntax elements, associated with the CUs above the current CU in a line buffer. The line buffer may comprise a memory unit, such as a register or random access memory (RAM) unit. For instance, if the current CU is in row k, the video coder may store in a line buffer information associated with CUs in row k−1, where k increases as rows descend from top to bottom in the picture, and where k=0 corresponds to the top-most row of of CU's in the picture. This line buffer may increase the complexity and cost associated with designing and implementing the video coder.

In accordance with the techniques of this disclosure, the video coder may identify, without reference to any neighboring CU that is above a current CU in a current picture, an entropy coding context in a set of one or more entropy coding contexts. The video coder may then entropy code a SDIP syntax element using the identified entropy coding context. Because the video coder identifies the entropy coding context without reference to information associated with any neighboring CU that is above the current CU, the video coder may not need a line buffer to store the information associated with the CUs above the current CU or may use a reduced size line buffer. This may simplify the design and implementation of the video coder.

For ease of explanation, this disclosure may describe CUs, PUs, or transform units (TUs) as having various spatial relationships with other CUs, PUs, or TUs. Such description may be interpreted to mean that the CUs, PUs, and TUs have the various spatial relationships to the video blocks that correspond to the other CUs, PUs, or TUs. In addition, this disclosure may describe certain CUs, PUs, and TUs as having certain sizes. Such description may be interpreted to mean that video blocks that correspond to such CUs, PUs, and TUs have such sizes. Furthermore, this disclosure may refer to a PU that a video coder is currently coding as the current PU. This disclosure may refer to a CU that a video coder is currently coding as the current CU. This disclosure may refer to a picture that a video coder is currently coding as the current picture.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram that illustrates an example video coding system 10 that may utilize one or more of the techniques of this disclosure. As used described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices or apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored on a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A recent draft of the upcoming HEVC standard, referred to as "HEVC Working Draft 7" or "WD7," is described in document JCTVC-I1003_d54, Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, Switzerland, May, 2012, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats such as VP8 and related formats.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., in a storage system) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture may be a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks may correspond to a treeblock. In some instances, a treeblock may be referred to as a largest coding unit (LCU) or a "coding treeblock." The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks that correspond to CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate an encoded representation of the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may be an encoded representation of the treeblock.

When video encoder 20 generates a coded slice, video encoder 20 may perform encoding operations on (i.e., encode) the treeblocks (which in this case represent largest coding units) in the slice according to a raster scan order or wavefront scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order or wavefront scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may correspond to a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks that correspond to other CUs. A non-partitioned CU may be a CU whose video block is not partitioned into video blocks that correspond to other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs that correspond to sub-blocks of the video block of the partitioned CU according to the z-scan order. In other words, video encoder 20 may encode a CU that corresponds to a top-left sub-block, a CU that corresponds to a top-right sub-block, a CU that corresponds to a bottom-left sub-block, and then a CU that corresponds to a bottom-right sub-block, in that order.

As a result of encoding the CUs of a treeblock according to a z-scan order, the CUs above, above-and-to-the-left, above-and-to-the-right, left, and below-and-to-the left of the current CU may have been encoded. CUs below or to the right of the current CU have not yet been encoded. Consequently, video encoder 20 may be able to access information generated by encoding some CUs that neighbor the current CU when encoding the current CU. However, video encoder 20 may be unable to access information generated by encoding other CUs that neighbor the current CU when encoding the current CU.

When encoding the current CU, video encoder 20 may partition the current CU into one or more prediction units (PUs). In other words, video encoder 20 may generate one or more PUs associated with the current CU, where the one or more PUs correspond to partitions (e.g., non-overlapping sub-blocks) of the video block that corresponds to the current CU. Video encoder 20 may generate a predictive video block for each PU of the current CU. The predictive video block that corresponds to a PU may be a block of samples. This disclosure may also refer to the predictive video block that corresponds to a PU as the predictive video block of the PU. Video encoder 20 may use intra prediction or inter prediction to generate the predictive video blocks that correspond the PUs of the current CU.

When video encoder 20 uses intra prediction to generate the predictive video block of a PU, video encoder 20 may generate the predictive video block of the PU based on samples of the current picture. If video encoder 20 uses intra prediction to generate predictive video blocks of the PUs of a CU, the CU is an intra-predicted CU.

When video encoder 20 uses inter prediction to generate the predictive video block of a PU, video encoder 20 may generate the predictive video block of the PU based on samples of one or more pictures other than the current picture. If video encoder 20 uses inter prediction to generate predictive video blocks of the PUs of a CU, the CU is an inter-predicted CU.

Furthermore, when video encoder 20 uses inter prediction to generate a predictive video block of a PU, video encoder 20 may generate motion information for the PU. The motion information for a PU may indicate one or more reference blocks. Each reference block may be a video block within a reference picture or a block of samples synthesized (e.g., interpolated) from samples in a reference picture. The reference picture may be a picture other than the current picture. Video encoder 20 may generate the predictive video block for the PU based on the reference blocks.

Video encoder 20 may partition the current CU into one or more PUs according to various partitioning modes. For instance, if the current CU is an intra-predicted CU, video coder 20 may partition the current CU into one or more PUs according to a 2N×2N partitioning mode, an N×N partitioning mode, 2N×hN partitioning mode, or an hN×2N partitioning mode. The 2N×hN partitioning mode and the hN×2N partitioning mode may be referred to as short distance intra prediction (SDIP) partitioning modes. In the names of these partitioning modes, N may denote one-half of the width or height of a video block and h may indicate a value greater than 0 and less than 1. FIGS. 4A-4D, described below, are conceptual diagrams that illustrate example modes of partitioning a CU into PUs when the CU is an intra-predicted CU.

When video encoder 20 partitions the current CU according to the 2N×2N partitioning mode, video encoder 20 does not partition the current CU. Rather, when video encoder 20 partitions the current CU according to the 2N×2N partitioning mode, there is only a single PU associated with the current CU. When video encoder 20 partitions the current CU according to the N×N partitioning mode, the video coder generates four square-shaped PUs associated with the current CU. A square-shaped PU may be a PU that corresponds to a square-shaped predictive video block.

When the video coder partitions the current CU according to a 2N×hN partitioning mode, the video coder may generate a plurality of rectangle-shaped horizontally-oriented PUs associated with the current CU. A rectangle-shaped horizontally-oriented PU may be a PU that corresponds to a non-square rectangle-shaped predictive video block having a width equal to a width of the video block that corresponds to the current CU. When the video coder partitions the current CU according to an hN×2N partitioning mode, the video coder may generate a plurality of rectangle-shaped vertically-oriented PUs that corresponds to the current CU. A rectangle-shaped vertically-oriented PU may be a PU that corresponds to a non-square rectangle-shaped predictive video block having a height equal to a height of the video block that corresponds to the current CU.

Video encoder 20 may generate one or more SDIP syntax elements that define the mode by the current CU is partitioned into PUs when the current CU is an intra predicted CU. For example, the SDIP syntax elements may include a SDIP flag and a SDIP direction flag. A first value (e.g., 0) of the SDIP flag may indicate that the current CU is partitioned into one or more square-shaped PUs. For instance, the first value of the SDIP flag may indicate that the current CU is partitioned into PUs according to the 2N×2N or N×N partitioning modes. A second value (e.g., 1) of the SDIP flag may indicate that the current CU is partitioned into a plurality of rectangle-shaped PUs. A first value (e.g., 0) of the SDIP direction flag may indicate that the current CU is partitioned into a plurality of vertically-oriented rectangle-shaped PUs. A second value (e.g. 1) of the SDIP direction flag may indicate that the current CU is partitioned into a plurality of horizontally-oriented rectangle-shaped PUs.

After video encoder 20 generates predictive video blocks that correspond to one or more PUs of the current CU, video encoder 20 may generate a residual video block that corresponds to the current CU. Each sample in the residual video block may have a value equal to the difference between a corresponding sample in the original video block of the current CU and a corresponding sample in a predictive video block of a PU of the current CU. Each sample in the original video block and predictive video block may be a luma or chroma value associated with a particular pixel. In other words, the residual video block of the current CU may indicate differences between samples in the predictive video blocks of the PUs of the current CU and the original video block of the current CU.

Furthermore, as part of performing an encoding operation on the current CU, video encoder 20 may partition the current CU into one or more transform units (TUs). Each of the TUs may correspond to a different residual video block. The residual video blocks that correspond to the TUs may be non-overlapping blocks of residual samples within the residual video block that corresponds to the current CU.

Video coder 20 may apply one or more transforms to residual video blocks that correspond to the TUs to generate transform coefficient blocks (i.e., blocks of transform coefficients) that correspond to the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which levels of transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks that correspond to TUs of a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as CABAC encoding operations, to at least some of these syntax elements.

To apply CABAC encoding to a syntax element, video encoder 20 may first identify a CABAC context. The CABAC context may identify probabilities of coding bits having particular values. For instance, a CABAC context may indicate a 0.7 probability of coding a 0-valued bit and a 0.3 probability of coding a 1-valued bit. After identifying the CABAC context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified CABAC context. If a bit of the syntax element has the value associated with the lower sub-interval, the encoded value may be equal to the lower boundary of the lower sub-interval. If the same bit of the syntax element has the value associated with the upper sub-interval, the encoded value may be equal to the lower boundary of the upper sub-interval. To encode the next bit of the syntax element, video encoder 20 may repeat these steps with the interval being the sub-interval associated with the value of the encoded bit. When video decoder 20 repeats these steps for the next bit, video encoder 20 may use modified probabilities based on the probabilities indicated by the identified CABAC context and the actual values of bits encoded.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. As part of extracting the syntax elements from the bitstream, video decoder 30 may perform entropy decoding operations on at least some of the syntax elements. For instance, video decoder 30 may perform CABAC decoding on at least some of the syntax elements (e.g., SDIP syntax elements).

When video decoder 30 performs CABAC decoding on a syntax element, video decoder 30 may identify a CABAC context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified CABAC context. If the encoded value is within the lower sub-interval, video decoder 30 may decode a bit having the value associated with the lower sub-interval. If the encoded value is within the upper sub-interval, video decoder 30 may decode a bit having the value associated with the upper sub-interval. To decode a next bit of the syntax element, video decoder 30 may repeat these steps with the interval being the sub-interval that contains the encoded value. When video decoder 30 repeats these steps for the next bit, video decoder 30 may use modified probabilities based on the probabilities indicated by the identified CABAC context and the decoded bits.

Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with the current CU, video decoder 30 may generate predictive video blocks that correspond to the PUs of the current CU based on the syntax elements. In addition, video decoder 30 may inverse quantize transform coefficient blocks that correspond to TUs of the current CU. Video decoder 30 may perform inverse transforms on the transform coefficient blocks to reconstruct residual video blocks that correspond to the TUs of the current CU. After generating the predictive video blocks and reconstructing the residual video blocks, video decoder 30 may reconstruct the video block of the current CU based on the predictive video blocks and the residual video blocks. In this way, video decoder 30 may reconstruct the video blocks that correspond to CUs based on the syntax elements in the bitstream.

As described above, if the current CU is an intra predicted CU, video encoder 20 may generate a SDIP syntax element that at least partially defines a mode by which the current CU is partitioned into a set of one or more PUs. In accordance with one or more techniques of this disclosure, video encoder 20 may, identify, without reference to any neighboring CU that is above the current CU in the current picture, an entropy coding context in a set of one or more entropy coding contexts. Video encoder 20 may then entropy encode the SDIP syntax element using the identified entropy coding context.

Similarly, when video decoder 30 parses a SDIP syntax element of the current CU from the bitstream, video decoder 30 may identify, without reference to any neighboring CU that is above the current CU in the current picture, an entropy coding context in the set of one or more entropy coding contexts. Video decoder 30 may then entropy decode the SDIP syntax element using the identified entropy coding context.

Because video encoder 20 and video decoder 30 identify the entropy coding context without reference to any neighboring CU that is above the current CU in the current picture, it may be unnecessary for video encoder 20 or video decoder 30 to store information associated with the CUs above the current CU for the purpose of selecting the entropy coding context. Hence, it may be unnecessary for video encoder 20 or video decoder 30 to include a line buffer to store such information.

A video coder, such as video encoder 20 or video decoder 30, may identify the entropy coding context for entropy coding a SDIP syntax element of the current CU in various ways. For example, the video coder may identify the entropy coding context based on a SDIP syntax element from a previously-coded CU. In this example, the previously-coded CU may be a CU that is positioned to the left of the current CU within the current picture. The SDIP syntax element from the previously-coded CU may at least partially define a mode in which the previously-coded CU is partitioned into PUs. In this example, the previously-coded CU may be the same size as the current CU. That is, the video block that corresponds to the previously-coded CU may be the same size as the video block that corresponds to the current CU.

In other examples, there may be two or more previously-coded CUs that are positioned to the left of the current CU. In such examples, the video coder may identify the entropy coding context for entropy coding a SDIP syntax element of the current CU based on a function of one or more of the SDIP syntax elements of one or more of the CUs to the left of the current CU. For example, the video coder may identify the entropy coding context based on a sum of the SDIP syntax elements of the two or more previously-coded CUs. For instance, the sum of the SDIP syntax elements of the two or more previously-coded CUs may be a context index that identifies the entropy coding context to use for entropy coding a corresponding SDIP syntax element of the current CU. A context index may be an identifier, such as a number, that identifies an entropy coding context in a set of one or more entropy coding contexts.

In another example, the video coder may identify the entropy coding context based on a mean of the SDIP syntax elements of the two or more previously-coded CUs. For instance, the mean of the SDIP syntax elements of the two or more previously-coded CUs may be associated with a context index that identifies the entropy coding context to use for entropy coding a corresponding SDIP syntax element of the current CU. In some examples, the video coder may round the mean of the SDIP syntax elements to a nearest context index. In other examples, different ranges may be associated with different context indexes. In such examples, the video coder may identify a particular one of the context indexes if the mean of the SDIP syntax elements falls within the range associated with the particular one of the context indexes.

In another example, the video coder may identify the entropy coding context based on an SDIP syntax element of a largest one of the two or more previously-coded CUs. For instance, the video coder may use a SDIP syntax element of the largest previously-coded CU as a context index that identifies the entropy coding context to use for entropy coding a corresponding SDIP syntax element of the current CU.

In another example, the video coder may identify the entropy coding context based on an SDIP syntax element of a topmost one of the two or more previously-coded CUs. For instance, the video coder may use a SDIP syntax element of the topmost previously-coded CU as a context index that identifies the entropy coding context to use for entropy coding a corresponding SDIP syntax element of the current CU.

In another example, the video coder may identify the entropy coding context based on an SDIP syntax element of one of the two or more previously-coded CUs that is positioned at or around a center of a left edge of the current CU. For instance, the video coder may use a SDIP syntax element of the previously-coded CU at or around the center of the left edge of the current CU as a context index that identifies the entropy coding context to use for entropy coding a corresponding SDIP syntax element of the current CU.

In some of examples above, the video coder may identify the entropy coding context for the SDIP flag of the current CU based on a function of one or more of the SDIP flags of the two or more previously-coded CUs. Similarly, in some examples, the video coder may identify the entropy coding context for the current SDIP direction flag of the current CU based on a function of one or more of the SDIP direction flags of the two or more previously-coded CUs.

In another example, the video coder may identify the entropy coding context to use for entropy encoding a SDIP syntax element of the current CU based on a size of the current CU. For example, if the current CU is an 8×8 CU, the video encoder may identify the entropy coding context having context index 0. In this example, if the current CU is a 16×16 CU, the video encoder may identify the entropy coding context having context index 1. Furthermore, in this example, if the current CU is a 32×32 CU, the video encoder may identify the entropy coding context having context index 2. In some examples, the video coder may use the same entropy coding context to entropy code SDIP syntax elements of CUs having different sizes.

In another example, the video coder may identify the entropy coding context to use for entropy coding a SDIP syntax element of the current CU based on a depth of the current CU. The depth of the current CU may indicate a level of the current CU in a quadtree of the treeblock associated with the current CU. CUs at different depths of the quadtree may have different sizes. For example, if the current CU is at a first level (e.g., CU_depth=1), the video encoder may identify the entropy coding context having context index 2. If the current CU is at a second level (e.g., CU_depth=2), the video encoder may identify the entropy coding context having context index 1. If the current CU is at a third level (e.g., CU_depth=3), the video encoder may identify the entropy coding context having context index 0. In some examples, the video coder may use the same entropy coding context to entropy code SDIP syntax elements of CUs at different depths.

Figure 6:
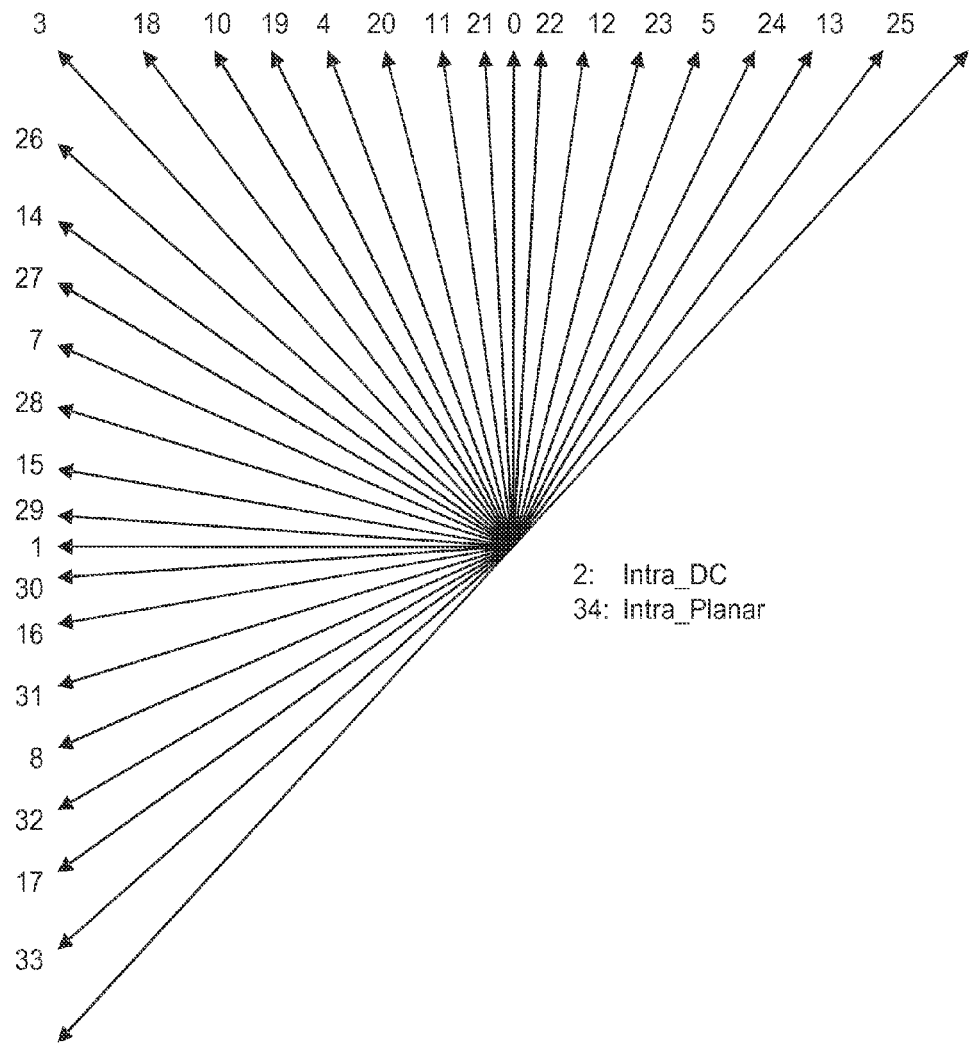
FIG. 6 is a conceptual diagram that illustrates example intra prediction modes.

In another example, the video coder may identify the entropy coding context to use for entropy coding a SDIP syntax element of the current CU based on an intra prediction mode of a PU of the current CU. In this example, the context index of the identified entropy coding context may be a function of an intra prediction mode of a PU of the current CU. For example, the video coder may identify the same entropy coding context for intra prediction modes having similar directions. For instance, the video coder may identify an entropy coding context having context index 0 for intra prediction modes with vertical or nearly vertical directions, such as intra prediction modes 12, 22, 1, 23, and so on. The video coder may identify an entropy coding context having context index 1 for intra prediction modes with horizontal or nearly horizontal directions, such as intra prediction modes 2, 30, 31, and so on. The video coder may identify an entropy coding context having context index 2 for intra prediction modes that do not have strong directionality, such as mode 3 (intra DC mode). FIG. 6, described below, is a conceptual diagram that illustrates example intra prediction modes.

In another example, the set of one or more entropy coding contexts only includes a single entropy coding context. In this example, the entropy coding context identified by the video coder is not dependent on any side information. Rather, the video coder may use a single entropy coding context for entropy coding SDIP syntax elements of every CU.

Figure 2:
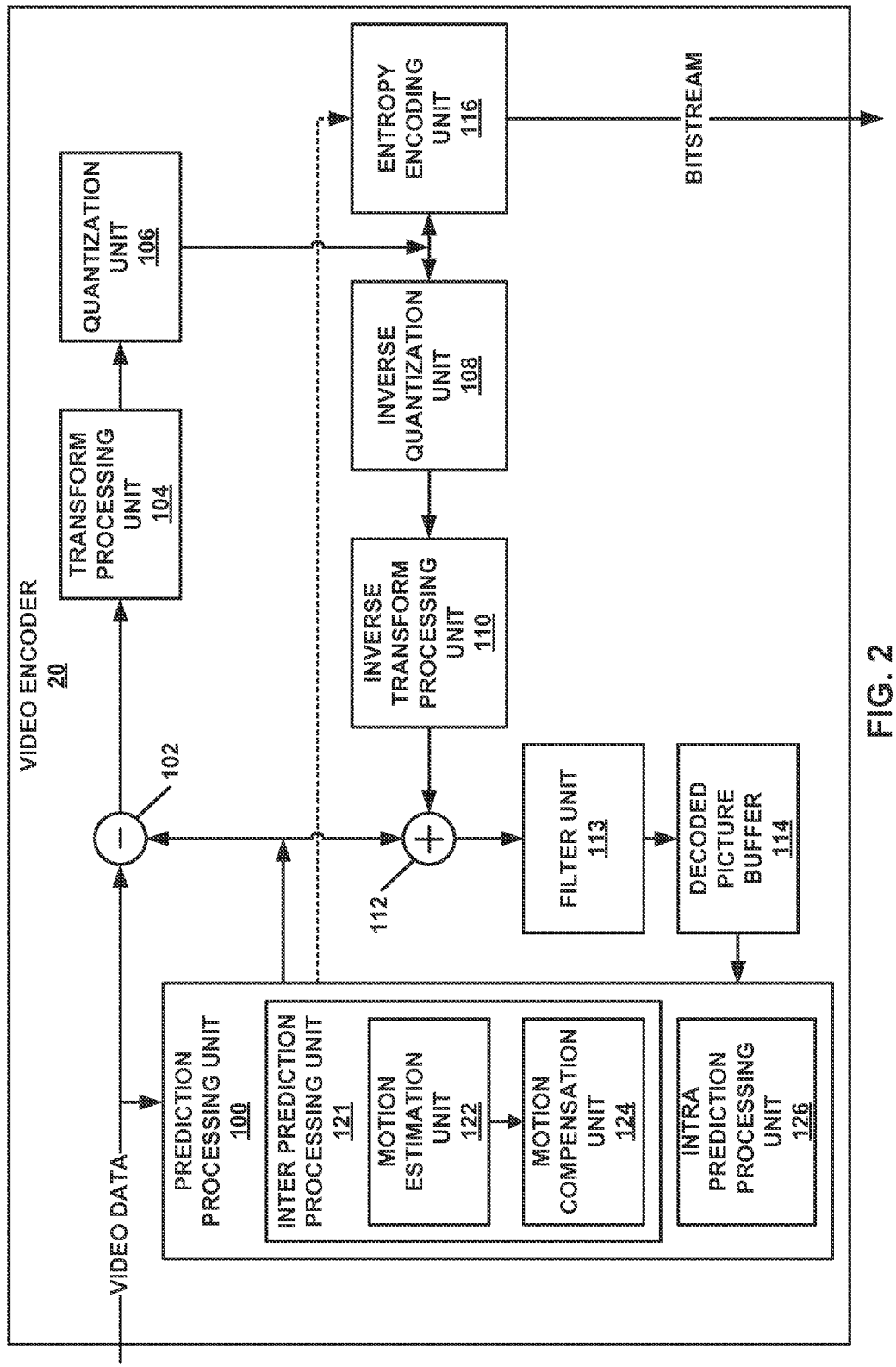
FIG. 2 is a block diagram that illustrates an example video encoder that is configured to implement one or more of the techniques described in this disclosure.

FIG. 2 is a block diagram that illustrates an example video encoder 20 that is configured to implement one or more of the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter prediction processing unit 121, motion estimation unit 122, a motion compensation unit 124, and an intra prediction processing unit 126. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Although this disclosure describes the functional components of video encoder 20 as units, it will be understood that the functionality associated with such units may be implemented in various ways, such as software, hardware, or various combinations of hardware and software. Furthermore, in some examples, the functionality associated with such unit is not provided by discrete modular units.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may correspond to a different CU. For example, prediction processing unit 100 may partition a video block that corresponds to a treeblock into four equally-sized sub-blocks, partition one or more of the sub-blocks into four equally-sized sub-sub-blocks, and so on.

The sizes of the video blocks that correspond to CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Video encoder 20 may perform encoding operations on each non-partitioned CU of a treeblock. When video encoder 20 performs an encoding operation on a non-partitioned CU, video encoder 20 may generate an encoded representation of the non-partitioned CU.

As part of performing an encoding operation on the current CU, prediction processing unit 100 may partition the current CU into one or more PUs. Video encoder 20 may partition the current CU according to various partitioning modes. Assuming that the size of the current CU is 2N×2N, video encoder 20 may partition the current CU according to 2N×2N, N×N, 2N×hN, or hN×2N partitioning modes for intra prediction. If video encoder 20 encodes the current CU using intra prediction, video encoder 20 may generate one or more SDIP syntax elements that indicate the partitioning mode used to partition the current CU into one or more PUs. Video encoder 20 may partition the current CU according to 2N×2N, 2N×N, N×2N, N×N, or similar partitioning modes for inter prediction. Video encoder 20 may also support asymmetric partitioning modes for inter prediction, such as 2N×nU, 2N×nD, nL×2N, and nR×2N partitioning modes. In some examples, video encoder 20 may select a partitioning mode for the current CU by encoding the current CU using at least some of the partitioning modes and comparing rate-distortion results.

Inter prediction processing unit 121 may perform inter prediction on each PU of the current CU. Inter prediction may provide compression that relies on temporal redundancies. When inter prediction processing unit 121 performs inter prediction on a PU, inter prediction processing unit 121 may generate predictive data for the PU. The predictive data for the PU may include a predictive video block that corresponds to the PU and motion information for the PU. Inter prediction processing unit 121 may generate the predictive video block based on samples of one or more pictures other than the current picture (i.e., reference pictures).

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

When the PU is in a P slice, motion estimation unit 122 may search the reference pictures in a first reference picture list (e.g., list 0) for a block of samples that most closely corresponds to the video block of the PU. In some examples, each reference picture listed in list 0 occurs before the current picture in display order. In some instances, motion estimation unit 122 may interpolate the identified block of samples from actual luma or chroma samples in a reference picture. After identifying the block of samples, motion estimation unit 122 may generate a reference picture index that indicates the reference picture in list 0 containing the identified block of samples and a motion vector that indicates a spatial displacement between the PU and the identified block of samples. Motion estimation unit 122 may output data that a video decoder may use to determine the reference picture index and the motion vector of the PU. Motion compensation unit 124 may generate a predictive video block that corresponds to the PU based on the block of samples indicated by the reference picture index and the motion vector of the PU. For instance, motion compensation unit 124 may generate a predictive video block that corresponds to the PU such that the predictive video block matches the identified block of samples.

Motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, motion compensation unit 124 may interpolate, from integer-position sample values in the reference picture, the block of samples use to generate the predictive video block.

If the current CU is in a B slice, motion estimation unit 122 may perform uni-directional inter prediction or bi-directional inter prediction for PUs of the current CU. When motion estimation unit 122 performs uni-directional inter prediction for a PU in a B slice, motion estimation unit 122 may search the reference pictures of list 0 or a second reference picture list (e.g., list 1) for a block of samples that corresponds to the video block that corresponds to the PU. Motion estimation unit 122 may then generate a reference picture index (ref_idx) that indicates the reference picture in list 0 or list 1 that contains the identified block of samples and a motion vector that indicates a spatial displacement between the identified block of samples and the PU. Motion estimation unit 122 may also generate prediction direction (pred_dir) indicators that indicate whether the PU is uni-directionally inter predicted based on a reference picture in list 0 or uni-directionally inter predicted based on a reference picture in list 1. Motion estimation unit 122 may output data that enables a video decoder to determine the reference picture index, the prediction direction indicators, and the motion vector of the PU. Motion compensation unit 124 may generate a predictive video block that corresponds to the PU based on the block of samples indicated by the reference picture index, prediction direction indicators, and motion vector of the PU.

When motion estimation unit 122 performs bi-directional inter prediction for a PU, motion estimation unit 122 may search the reference pictures in list 0 and the reference pictures in list 1 for blocks of samples that correspond to the video block of the PU. Motion estimation unit 122 may then generate reference picture indexes that indicate the reference pictures in list 0 and list 1 containing the identified blocks of samples and motion vectors that indicate spatial displacements between the identified blocks of samples and the PU. Motion estimation unit 122 may also generate one or more prediction direction indicators that indicate that the PU is bi-directionally inter predicted. Motion estimation unit 122 may output data that a video decoder may use to determine the reference picture indexes, the motion vectors, and the one or more prediction direction indicators as the motion information of the PU. Motion compensation unit 124 may generate a predictive video block that corresponds to the PU based on the blocks of samples indicated by the reference picture index, prediction direction indicator, and motion vector of the PU.

As part of performing an encoding operation on a CU, intra prediction processing unit 126 may perform intra prediction on PUs of the CU. Intra prediction may provide spatial compression. Intra prediction processing unit 126 may perform intra prediction on PUs in I slices, P slices, and B slices. When intra prediction processing unit 126 performs intra prediction on a PU, intra prediction processing unit 126 may generate predictive data for the PU based on decoded samples of other PUs in the same picture. The predictive data for the PU may include a predictive video block and various syntax elements.

To perform intra prediction on a PU, intra prediction processing unit 126 may use multiple intra prediction modes to generate multiple sets of predictive data for the PU. When intra prediction processing unit 126 uses an intra prediction mode to generate a set of predictive data for the PU, intra prediction processing unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom coding order for PUs, CUs, and treeblocks. Intra prediction processing unit 126 may use various numbers of intra prediction modes, e.g., 33 directional intra prediction modes. In some examples, the number of intra prediction modes may depend on the size of the PU.

Prediction processing unit 100 may select the predictive data for a PU from among the predictive data generated by motion compensation unit 124 for the PU or the predictive data generated by intra prediction processing unit 126 for the PU. In some examples, prediction processing unit 100 selects the predictive data for the PU based on rate/distortion metrics of the sets of predictive data.

If prediction processing unit 100 selects predictive data generated by intra prediction processing unit 126, prediction processing unit 100 may signal the intra prediction mode that was used to generate the predictive data for the PU, i.e., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode (MPM) for the current PU. Thus, prediction processing unit 100 may generate a syntax element to indicate that the selected intra prediction mode is the same as the intra prediction mode of the neighboring PU.

After prediction processing unit 100 selects the predictive data for PUs of the current CU, residual generation unit 102 may generate residual data for the current CU by subtracting the predictive video blocks of the PUs of the current CU from the video block of the current CU. The residual data of a CU may include 2D residual video blocks that correspond to different sample components of the samples in the video block of the current CU. For example, the residual data may include a residual video block that corresponds to differences between luminance components of samples in the predictive video blocks of the PUs of the current CU and luminance components of samples in the original video block of the current CU. In addition, the residual data of the current CU may include residual video blocks that correspond to the differences between chrominance components of samples in the predictive video blocks of the PUs of the current CU and the chrominance components of the samples in the original video block of the current CU.

Prediction processing unit 100 may perform quadtree partitioning to partition the residual video blocks of the current CU into sub-blocks. Each undivided residual video block may correspond to a different TU of the current CU. The sizes and positions of the residual video blocks that correspond to TUs of the current CU may or may not be based on the sizes and positions of predictive video blocks that correspond to the PUs of the current CU. A quadtree structure known as a "residual quad tree" (RQT) may include nodes associated with each of the residual video blocks. The TUs of the current CU may correspond to leaf nodes of the RQT.

For both I-mode and P- or B-mode, the prediction error, i.e., the difference between the samples in the block being encoded and samples in the predicted block, is represented as a set of weighted basis functions of some discrete transform, such as a discrete cosine transform (DCT). For each TU of the current CU, transform processing unit 104 may generate one or more transform coefficient blocks that correspond to the TU by applying one or more transforms to a residual video block that corresponds to the TU. Each of the transform coefficient blocks may be a 2D matrix of transform coefficients. Transform processing unit 104 may apply various transforms to the residual video block. For example, transform processing unit 104 may apply a discrete cosine transform (DCT), a directional transform, or a conceptually similar transform to the residual video block. The transform may be configured to transform spatial domain residual pixel values to coefficients in a transform domain, such as a frequency domain. The transform coefficients may form weights for the basis functions of the underlying transform.

After transform processing unit 104 generates a transform coefficient block that corresponds to a TU, quantization unit 106 may quantize the transform coefficients in the transform coefficient block. Quantization unit 106 may quantize a transform coefficient block that corresponds to a TU of a CU based on a QP value associated with the current CU.

Video encoder 20 may associate a QP value with the current CU in various ways. For example, video encoder 20 may perform a rate-distortion analysis on a treeblock associated with the current CU. In the rate-distortion analysis, video encoder 20 may generate multiple coded representations of the treeblock by performing an encoding operation multiple times on the treeblock using different modes. Video encoder 20 may associate different QP values with the current CU when video encoder 20 generates different encoded representations of the treeblock. In some examples, video encoder 20 may signal that a given QP value is associated with the current CU when the given QP value is associated with the current CU in a coded representation of the treeblock that has a lowest bit rate and distortion metric. In other examples, video encoder 20 may test various QP values to determine a QP value that yields an encoded representation of the CU that satisfies a threshold, even if the encoded representation of the CU does not have the optimum bit rate and distortion metric.

Inverse quantization unit 108 and inverse transform processing unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predictive video blocks generated by prediction processing unit 100 to produce a reconstructed video block that corresponds to a TU. By reconstructing video blocks for each TU of the current CU in this way, video encoder 20 may reconstruct the video block of the current CU.

After reconstruction unit 112, represented as a summer, reconstructs the video block of the current CU, filter unit 113 may perform a deblocking operation to reduce blocking artifacts in the video block that corresponds to the current CU. After performing the one or more deblocking operations, filter unit 113 may store the reconstructed video block of the current CU in decoded picture buffer 114 for use in intra-predictive coding of other CUs in the current picture or inter-predictive coding of CUs in other pictures. Motion estimation unit 122 and motion compensation unit 124 may use a reference picture that contains the reconstructed video block to perform inter prediction on PUs of subsequent pictures. In addition, intra prediction processing unit 126 may use reconstructed video blocks in decoded picture buffer 114 to perform intra prediction on other PUs in the current picture.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of coding particular bins that have particular values. In the context of CABAC, the term "bin" is used to refer to a bit of a binarized version of a syntax element. For example, in accordance with the techniques of this disclosure, entropy coding unit 116 may identify, without reference to any neighboring CU that is above a current CU in the current picture, an entropy coding context in a set of one or more entropy coding contexts. Entropy coding unit 116 may then entropy encode a SDIP syntax element of the current CU using the identified entropy coding context.

Figure 3:
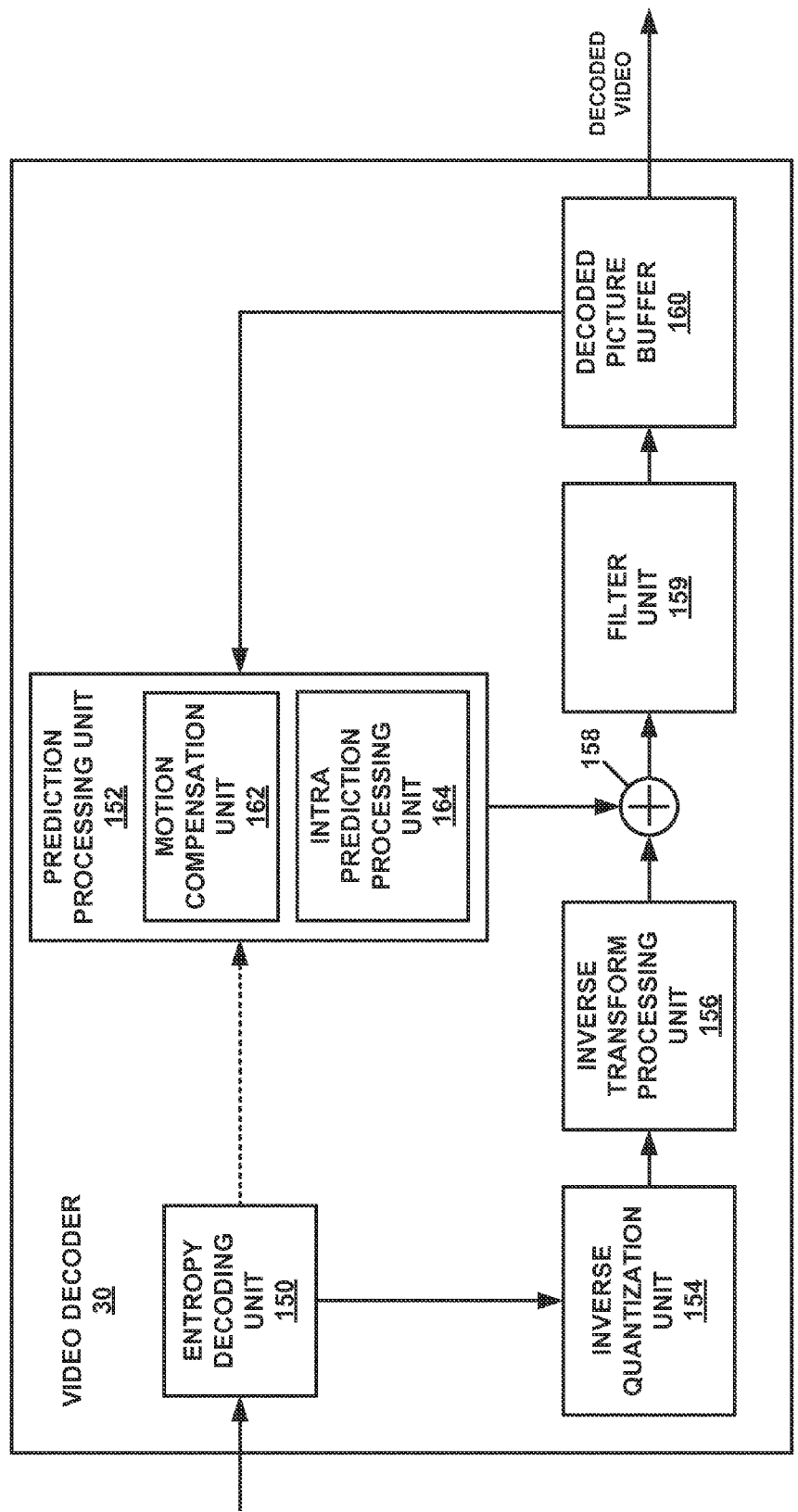
FIG. 3 is a block diagram illustrating an example video decoder that is configured to implement one or more of the techniques described in this disclosure.

FIG. 3 is a block diagram that illustrates an example video decoder 30 that is configured to implement one or more of the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra prediction processing unit 164. In other examples, video decoder 30 may include more, fewer, or different functional components.

Although this disclosure describes the functional components of video decoder 30 as modules, it will be understood that the functionality associated with such modules may be implemented in various ways, such as software, hardware, or various combinations of hardware and software. Furthermore, in some examples, the functionality associated with such modules is not provided by discrete modular units.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform processing unit 156, reconstruction unit 158, and filter unit 159 may perform a reconstruction operation that generates decoded video data based on the syntax elements extracted from the bitstream.

As part of extracting the syntax elements from the bitstream, entropy decoding unit 150 may perform parsing operations that extract syntax elements from coded CUs. Entropy decoding unit 150 may then perform entropy decoding operations on at least some of the syntax elements. For example, in accordance with the techniques of this disclosure, entropy decoding unit 150 may identify, without reference to any neighboring CU that is above a current CU in the current picture, an entropy coding context in a set of one or more entropy coding contexts. In this example, entropy decoding unit 150 may entropy decode a SDIP syntax element of the current CU using the identified entropy coding context.

After entropy decoding unit 150 extracts the syntax elements of the current CU, video decoder 30 may perform a reconstruction operation on the current CU. To perform the reconstruction operation on the current CU, video decoder 30 may perform a reconstruction operation on each TU of the current CU. By performing the reconstruction operation for each TU of the current CU, video decoder 30 may reconstruct a residual video block associated with the current CU.

As part of performing a reconstruction operation on a TU, inverse quantization unit 154 may inverse quantize, i.e., de-quantize, a transform coefficient block that corresponds to the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for the current CU to determine a degree of quantization and, likewise, a degree of inverse quantization for inverse quantization unit 154 to apply.

After inverse quantization unit 154 inverse quantizes a transform coefficient block that corresponds to a TU, inverse transform processing unit 156 may apply one or more transforms in order to generate a residual video block that corresponds to the TU. For example, inverse transform processing unit 156 may apply an inverse DCT, an inverse integer transform, an inverse Karhunen-Loeve transform (KLT), an inverse rotational transform, an inverse directional transform, or another inverse transform to the transform coefficient block in order to generate a residual video block.

In some examples, inverse transform processing unit 156 may determine an inverse transform to apply to the transform coefficient block based on signaling from video encoder 20. In other examples, inverse transform processing unit 156 may infer the inverse transform from one or more coding characteristics, such as block size, coding mode, or the like. In some examples, inverse transform processing unit 156 may apply a cascaded inverse transform.

In some examples, motion compensation unit 162 may refine the predictive video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predictive video block of the PU to calculate interpolated values for sub-integer samples of a reference block. Motion compensation unit 162 may determine the interpolation filters used by video encoder 20 according to received syntax information and use the interpolation filters to produce the predictive video block.

If a PU is encoded using intra prediction, intra prediction processing unit 164 may perform intra prediction to generate a predictive video block for the PU. For example, intra prediction processing unit 164 may determine an intra prediction mode for the PU based on syntax elements in the bitstream. The bitstream may include syntax elements that intra prediction processing unit 164 may use to determine the intra prediction mode of the PU.

Reconstruction unit 158 may use the residual video blocks that correspond to TUs of the current CU and the predictive video blocks of the PUs of the CU to reconstruct the video block of the current CU. For example, reconstruction unit 158 may add the residual video blocks to the predictive video blocks to reconstruct the video block that corresponds to the current CU.

After reconstruction unit 158 reconstructs the video block of the CU, filter unit 159 may perform a deblocking operation to reduce blocking artifacts in the reconstructed video block. After filter unit 159 performs the deblocking operation, video decoder 30 may store the video block of the CU in decoded picture buffer 160. Decoded picture buffer 160 may provide reference pictures for subsequent motion compensation, intra prediction, and presentation on a display device, such as display device 32 of FIG. 1.

Figure 4A:
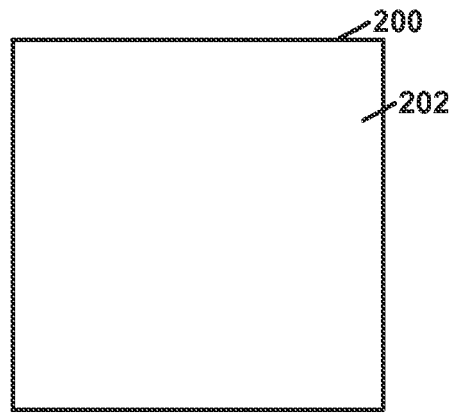
FIGS. 4A-4D are conceptual diagrams that illustrate example modes of partitioning a coding unit (CU) into prediction units when the CU is an intra predicted CU.
Figure 4B:
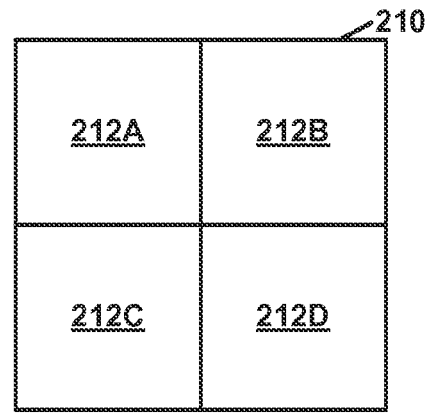
Figure 4C:
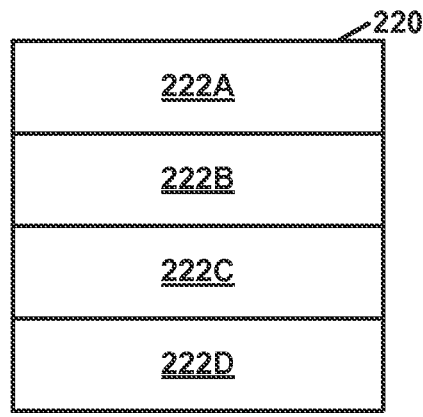
Figure 4D:
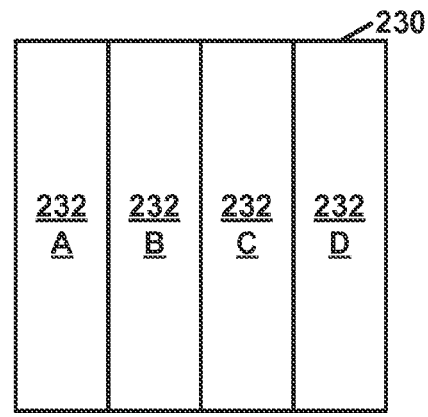

FIGS. 4A-4D are conceptual diagrams that illustrate example modes of partitioning a coding unit (CU) into PUs when the CU is an intra-predicted CU. As illustrated in the example of FIG. 4A, a CU 200 is partitioned according to a 2N×2N partitioning mode. Accordingly, CU 200 is only associated with a single PU 202 that is the same size as CU 200. As illustrated in the example of FIG. 4B, a CU 210 is partitioned according to an N×N partitioning mode. Accordingly, CU 210 is associated with four square-shaped PUs 212A-212D. As illustrated in the example of FIG. 4C, a CU 220 is partitioned according to a 2N×hN partitioning mode. Accordingly, in the example of FIG. 4C, CU 220 is associated with four horizontally-oriented rectangle-shaped PUs 222A-222D. In the example of FIG. 4D, a CU 230 is partitioned according to an hN×2N partitioning mode. Accordingly, in the example of FIG. 4D, CU 230 is associated with four vertically-oriented, rectangle-shaped PUs 232A-232D.

Figure 5A:
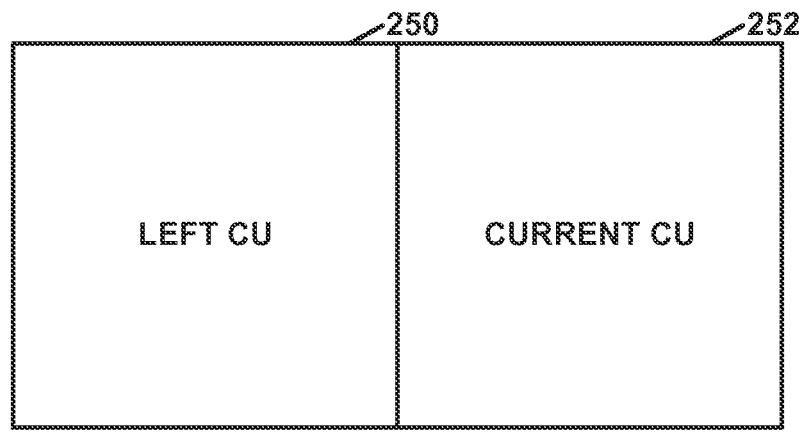
FIG. 5A is a conceptual diagram that illustrates an example CU from which a video coder may identify an entropy coding context for entropy coding a short-distance intra prediction (SDIP) syntax element of a current CU.

FIG. 5A is a conceptual diagram that illustrates an example CU 250 from which a video coder may identify an entropy coding context for entropy coding a SDIP syntax element of a current CU 252. In the example of FIG. 5A, CU 250 is positioned to the left of current CU 252. Consequently, CU 250 is a previously-coded CU. In some examples, a video coder may identify an entropy coding context for entropy coding a SDIP syntax element of current CU 252 based on a SDIP syntax element of CU 250. For instance, the video coder may identify an entropy coding context for entropy coding a SDIP flag of current CU 252 based on a SDIP flag of CU 250. Similarly, the video coder may identify an entropy coding context for entropy coding a SDIP direction flag of current CU 252 based on a SDIP direction flag of CU 250. In this way, the video coder may identify, without reference to a CU that is above current CU 252, an entropy coding context for entropy coding a SDIP syntax element of current CU 252.

Figure 5B:
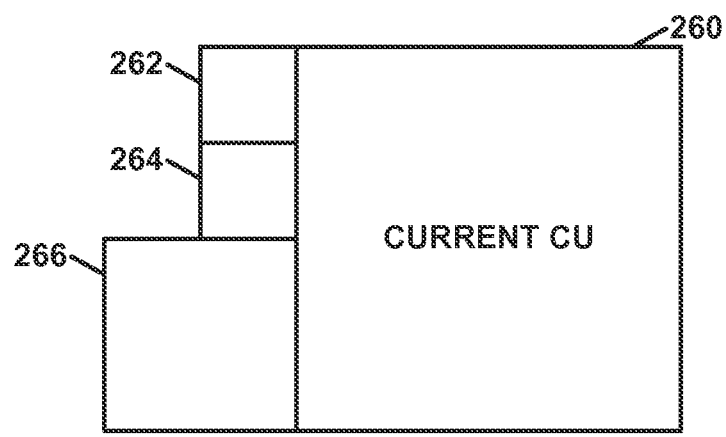
FIG. 5B is a conceptual diagram that illustrates other example CUs from which a video coder may identify an entropy coding context for entropy coding a SDIP syntax element of a current CU.

FIG. 5B is a conceptual diagram that illustrates other example CUs from which a video coder may identify an entropy coding context for entropy coding a SDIP syntax element of a current CU 260. In the example of FIG. 5B, CUs 262, 264, and 266 are located to the left of current CU 260. In some examples, the video coder may identify the entropy coding context for entropy coding a SDIP syntax element of current CU 260 based on a function of one or more of the SDIP syntax elements of CUs 262, 264, and 266. For instance, the video coder may identify the entropy coding context based on a sum or a mean of the SDIP flags or SDIP direction flags of CUs 262, 264, and 266. In another example, the video coder may identify the entropy coding context for entropy coding a SDIP syntax element of current CU 260 based on an SDIP syntax element of a largest one of the CUs to the left of current CU 260, i.e., CU 266. In another example, the video coder may identify the entropy coding context for entropy coding a SDIP syntax element of current CU 260 based on an SDIP syntax element of a topmost CU that is positioned to the left of current CU 260, i.e., CU 262. In another example, the video coder may identify the entropy coding context for entropy coding a SDIP syntax element of current CU 260 based on an SDIP syntax element of a CU that is positioned at or around a center of a left edge of current CU 260, i.e., CU 264 or CU 266.

FIG. 6 is a conceptual diagram that illustrates example intra prediction modes. In some examples, a video coder may identify an entropy coding context to use for entropy coding a SDIP syntax element of a current CU based on an intra prediction mode of the current CU. In some such examples, the video coder may identify a first entropy coding context when the current CU has an intra prediction mode that is vertical or nearly vertical, such as intra prediction modes 4, 20, 11, 21, 0, 22, 12, 23, and 5. The video coder may identify a second entropy coding context when the current CU has an intra prediction mode that is horizontal or nearly horizontal, such as intra prediction modes 7, 28, 15, 29, 1, 30, 16, 31, and 8. The video coder may identify a third entropy coding context when the current CU has an intra prediction mode that does not have a strong directionality, such as intra prediction modes 2, 34, 33, 17, 32, 27, 14, 26, 3, 18, 10, 19, 24, 13, and 25.

Figure 7:
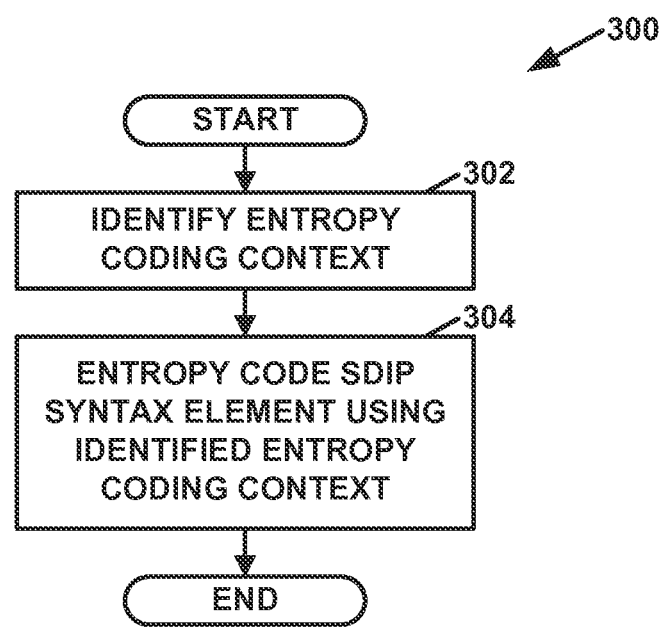
FIG. 7 is a flowchart that illustrates an example operation of a video coder, in accordance with one or more techniques of this disclosure.

FIG. 7 is a flowchart that illustrates an example operation 300 of a video coder, in accordance with one or more techniques of this disclosure. In the example of FIG. 7, a video coder may identify, without reference to any neighboring CU that is above a current CU in a current picture, an entropy coding context in a set of one or more entropy coding contexts (302). In addition, the video coder may entropy code a SDIP syntax element using the identified entropy coding context (304). The SDIP syntax element may at least partially define a mode by which the current CU is partitioned into a set of one or more PUs. For example, the SDIP syntax element may indicate whether the current CU is partitioned into one or more square-shaped PUs. In another example, the SDIP syntax element may indicate whether the current CU is partitioned into a plurality of vertically-oriented or horizontally-oriented rectangle-shaped PUs.

Figure 8:
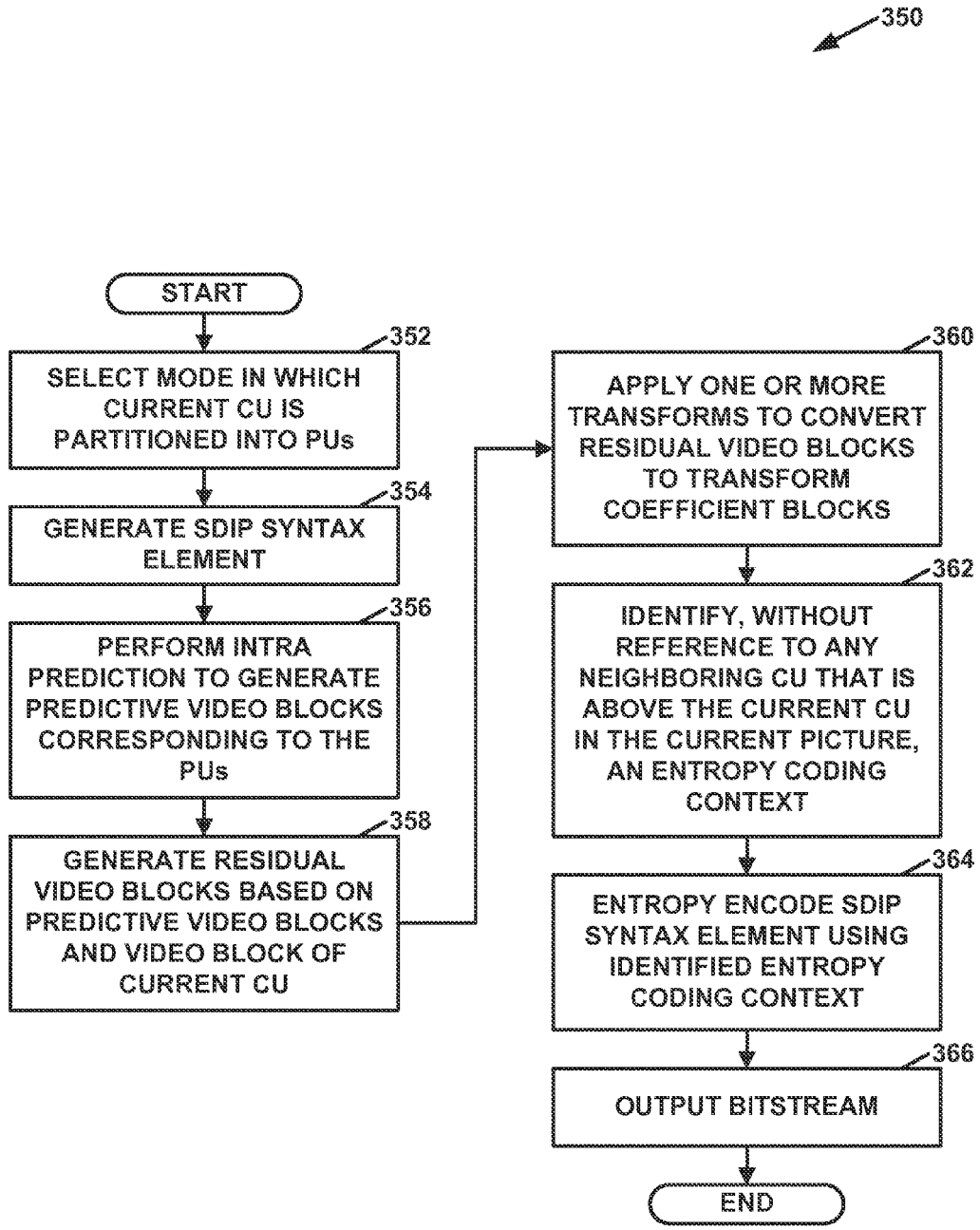
FIG. 8 is a flowchart that illustrates an example operation of a video encoder, in accordance with one or more techniques of this disclosure.

FIG. 8 is a flowchart that illustrates an example operation 350 of video encoder 20, in accordance with one or more techniques of this disclosure. Although operation 350 is described with reference to video encoder 20 of FIG. 1, operation 350 is not so limited. For ease of explanation, example of FIG. 8 assumes that the current CU is an intra predicted CU.

In the example of FIG. 8, video encoder 20 may select a mode in which the current CU is partitioned into the one or more PUs (352). Video encoder 20 may then generate a SDIP syntax element of the current CU (354). The SDIP syntax element may at least partially define a mode by which the current CU is partitioned into a set of one or more PUs. Video encoder 20 may then perform intra prediction to generate predictive video blocks that correspond to the PUs of the current CU (356). Video encoder 20 may generate residual video blocks that correspond to TUs of the current CU based on the predictive video blocks and the video block of the current CU (358). After generating the one or more residual video blocks that correspond to the TUs of the current CU, video encoder 20 may apply one or more transforms to convert the residual video blocks into transform coefficient blocks that correspond to the TUs of the current CU (360).

Video encoder 20 may identify, without reference to any neighboring CU that is above the current CU in the current picture, an entropy coding context in a set of one or more entropy coding contexts (362). In addition, video encoder 20 may entropy encode the SDIP syntax element of the current CU using the identified entropy coding context (364). For example, video encoder 20 may perform a CABAC encoding operation on the SDIP syntax element using the identified entropy coding context. Subsequently, video encoder 20 may output a bitstream that includes encoded representations of the SDIP syntax element, the transform coefficient blocks, and other syntax elements (366).

Figure 9:
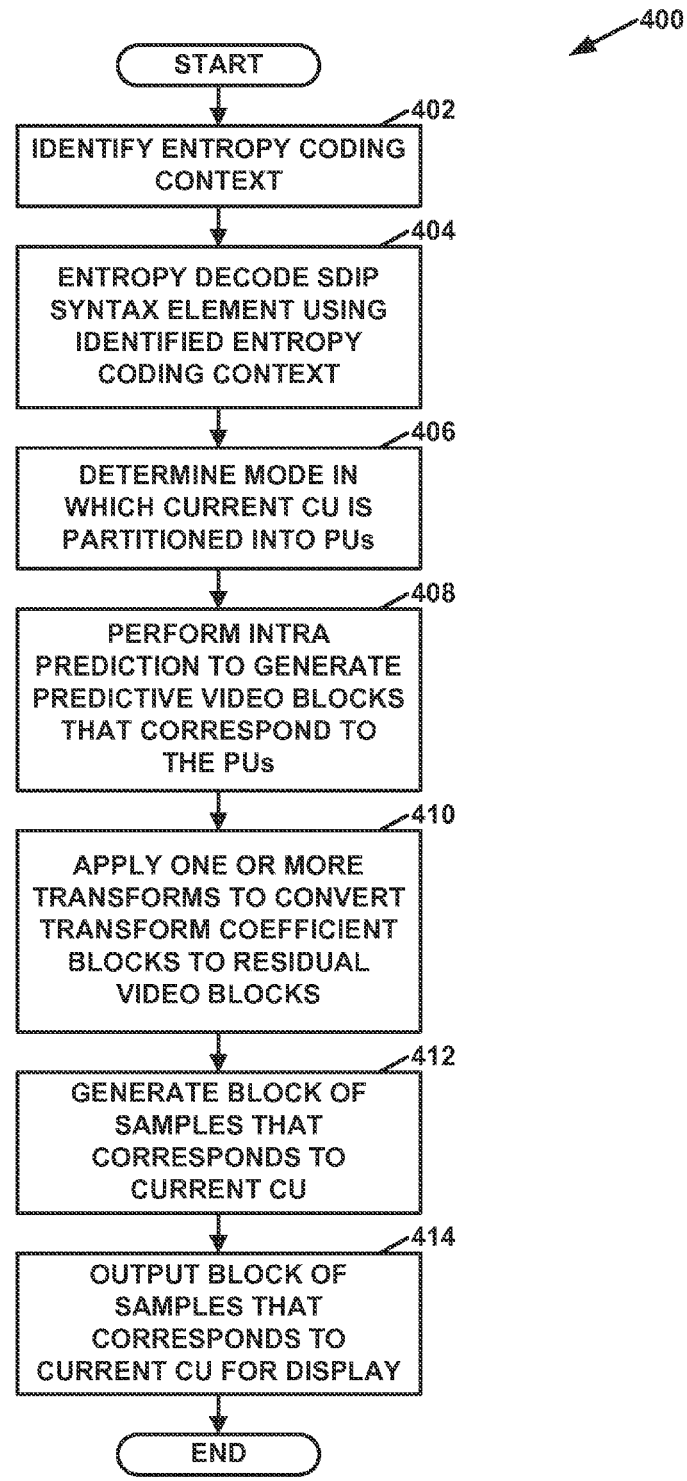
FIG. 9 is a flowchart that illustrates an example operation of a video decoder, in accordance with one or more techniques of this disclosure.

FIG. 9 is a flowchart that illustrates an example operation 400 of video decoder 30, in accordance with one or more techniques of this disclosure. Although operation 400 is described with reference to video decoder 30 of FIG. 1, operation 400 is not so limited. For ease of explanation, this example of FIG. 9 assumes that the current CU is an intra predicted CU.

In the example of FIG. 9, video decoder 30 may identify, without reference to any neighboring CU that is above the current CU in the current picture, an entropy coding context in a set of one or more entropy coding contexts (402). In addition, video decoder 30 may entropy decode a SDIP syntax element of the current CU using the identified entropy coding context (404). For example, video decoder 30 may perform a CABAC decoding operation on the SDIP syntax element using the identified entropy coding context.

Video decoder 30 may then determine, based at least in part on the SDIP syntax element of the current CU, the mode in which the current CU is partitioned into one or more PUs (406). Video decoder 30 may then perform intra prediction to generate predictive video blocks that correspond to the one or more PUs associated with the current CU (408). In addition, video decoder 30 may apply one or more transforms to convert transform coefficient blocks that correspond to TUs of the current CU into residual video blocks that correspond to the TUs of the current CU (410). Subsequently, video decoder 30 may generate a block of samples that corresponds to the current CU based on the residual video blocks that correspond to the TUs of the current CU and the predictive video blocks that correspond to the PUs of the current CU (412). Video decoder 30 may then output the block of samples that corresponds to the current CU for display (414).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware or software units. Rather, as described above, various components, modules, and units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A video decoding method performed by a video decoding apparatus, the method comprising;
   receiving encoded video data;
   selecting, based on an intra prediction mode of a prediction unit (PU) of a current coding unit (CU) of the encoded video data, an entropy coding context in a set of entropy coding contexts, the set of entropy coding contexts including a first entropy coding context and a second, different entropy coding context, each respective entropy coding context of the set of entropy coding contexts indicating respective probabilities of coding particular bit values, wherein selecting the entropy coding context comprises selecting the first entropy coding context based on whether the intra prediction mode of the PU is a vertical intra prediction mode and selecting the second entropy coding context based on whether the intra prediction mode of the PU is a horizontal intra prediction mode, the current CU having one or more PUs; and
   entropy decoding a short-distance intra-prediction (SDIP) syntax element using the selected entropy coding context, the SDIP syntax element at least partially defining a mode by which the current CU is partitioned into the one or more PUs, the SDIP syntax element including a flag indicating that the current CU is partitioned into vertically or horizontally oriented rectangle-shaped PUs.

2. The video decoding method of claim 1, wherein entropy decoding the SDIP syntax element comprises performing context adaptive binary arithmetic coding (CABAC) on the SDIP syntax element using the selected entropy coding context.

3. The video decoding method of claim 1, further comprising:
   after entropy decoding the SDIP syntax element, determining, based at least in part on the SDIP syntax element, the mode by which the current CU is partitioned into the one or more PUs;
   applying one or more transforms to convert transform coefficient blocks that correspond to transform units (TUs) of the current CU into residual video blocks that correspond to the TUs of the current CU;
   performing intra prediction to generate predictive video blocks that correspond to the one or more PUs associated with the current CU;
   generating a block of samples that corresponds to the current CU based on the residual video blocks and the predictive video blocks; and
   outputting the block of samples that corresponds to the current CU for display.

4. The video decoding method of claim 1, wherein the SDIP syntax element is a first SDIP syntax element,
   wherein a first value of a second SDIP syntax element indicates that the current CU is partitioned into one or more square-shaped PUs, and
   wherein a second value of the second SDIP syntax element indicates that the current CU is partitioned into a plurality of rectangle-shaped PUs.

5. The video decoding method of claim 1,
   wherein a first value of the SDIP syntax element indicates that the current CU is partitioned into a plurality of vertically-oriented rectangle-shaped PUs, and
   wherein a second value of the SDIP syntax element indicates that the current CU is partitioned into a plurality of horizontally-oriented rectangle-shaped PUs.

6. A video decoding apparatus comprising:
   a data storage medium storing encoded video data; and
   a video decoder, the video decoder configured to:
   receive the encoded video data;
   select, based on an intra prediction mode of a prediction unit (PU) of a current coding unit (CU) of the encoded video data, an entropy coding context in a set of entropy coding contexts, the set of entropy coding contexts including a first entropy coding context and a second, different entropy coding context, each respective entropy coding context of the set of entropy coding contexts indicating respective probabilities of coding particular bit values, wherein the video decoder selects the first entropy coding context based on whether the intra prediction mode of a the PU is a vertical intra prediction mode and selects the second entropy coding context based on whether the intra prediction mode of the PU is a horizontal intra prediction mode, the current CU having one or more PUs; and
   entropy decode a short-distance intra-prediction (SDIP) syntax element using the selected entropy coding context, the SDIP syntax element at least partially defining a mode by which the current CU is partitioned into the one or more PUs, the SDIP syntax element including a flag indicating that the current CU is partitioned into vertically or horizontally oriented rectangle-shaped PUs.

7. The video decoding apparatus of claim 6, wherein the video decoder is configured to perform context adaptive binary arithmetic coding (CABAC) on the SDIP syntax element using the selected entropy coding context.

8. The video decoding apparatus of claim 6, wherein the video decoder is configured to:
   after entropy decoding the SDIP syntax element, determine, based at least in part on the SDIP syntax element, the mode by which the current CU is partitioned into the one or more PUs;
   apply one or more transforms to convert transform coefficient blocks that correspond to transform units (TUs) of the current CU into residual video blocks that correspond to the TUs of the current CU;
   perform intra prediction to generate predictive video blocks that correspond to the one or more PUs associated with the current CU;
   generate a block of samples that corresponds to the current CU based on the residual video blocks and the predictive video blocks; and
   output the block of samples that corresponds to the current CU for display.

9. The video decoding apparatus of claim 6, wherein the SDIP syntax element is a first SDIP syntax element,
   wherein a first value of a second SDIP syntax element indicates that the current CU is partitioned into one or more square-shaped PUs, and
   wherein a second value of the second SDIP syntax element indicates that the current CU is partitioned into a plurality of rectangle-shaped PUs.

10. The video decoding apparatus of claim 6,
    wherein a first value of the SDIP syntax element indicates that the current CU is partitioned into a plurality of vertically-oriented rectangle-shaped PUs, and wherein a second value of the SDIP syntax element indicates that the current CU is partitioned into a plurality of horizontally-oriented rectangle-shaped PUs.

11. A video decoding apparatus comprising: means for storing encoded video data; means for receiving the encoded video data; means for selecting, based on an intra prediction mode of a prediction unit (PU) of a current coding unit (CU) of the encoded video data, an entropy coding context in a set of entropy coding contexts, the set of entropy coding contexts including a first entropy coding context and a second, different entropy coding context, each respective entropy coding context of the set of entropy coding contexts indicating respective probabilities of coding particular bit values, wherein selecting the entropy coding context comprises selecting the first entropy coding context based on whether the intra prediction mode of the PU is a vertical intra prediction mode and selecting the second entropy coding context based on whether the intra prediction mode of the PU is a horizontal intra prediction mode, the current CU having one or more PUs; and means for entropy decoding a short-distance intra-prediction (SDIP) syntax element using the selected entropy coding, context, the SDIP syntax element at least partially defining a mode by which the current CU is partitioned into the one or more PUs, the SDIP syntax element including a flag indicating that the current CU is partitioned into vertically or horizontally oriented rectangle-shaped PUs.

12. A non-transitory computer-readable storage medium comprising instructions that, when executed, cause one or more processors of a device for video decoding to:
receive encoded video data;
select, based on an intra prediction mode of a prediction unit (PU) of a current coding unit (CU) of the encoded video data, an entropy coding context in a set of entropy coding contexts, the set of entropy coding contexts including a first entropy coding context and a second, different entropy coding context, each respective entropy coding context of the set of entropy coding contexts indicating respective probabilities of coding particular bit values, wherein the instructions cause the one or more processors to select the first entropy coding context based on whether the intra prediction mode of the PU is a vertical intra prediction mode and select the second entropy coding context based on whether the intra prediction mode of the PU is a horizontal intra prediction mode, the current CU having one or more PUs; and
entropy decode a short-distance intra-prediction (SDIP) syntax element using the selected entropy coding context, the SDIP syntax element at least partially defining a mode by which the current CU is partitioned into the one or more PUs, the SDIP syntax element including a flag indicating that the current CU is partitioned into vertically or horizontally oriented rectangle-shaped PUs.

13. The video decoding method of claim 1, wherein selecting the entropy coding context comprises selecting, without accessing a line buffer storing the information associated with CUs above the current CU, the entropy coding context in the set of entropy coding contexts.

14. The video decoding apparatus of claim 6, comprising at least one of:
an integrated circuit;
a microprocessor; or
a wireless communication device.

15. The video decoding apparatus of claim 6, further comprising a display configured to display decoded pictures of the video data.

16. The video decoding method of claim 1,
the video decoding apparatus being a wireless communication device, wherein the wireless communication device comprises:
a memory configured to store the video data;
a processor configured to execute instructions to process the video data stored in the memory; and
a receiver configured to receive the encoded video data, the encoded video data comprising an entropy encoded version of the SDIP syntax element.

17. The video decoding method of claim 16, wherein the wireless communication device is a wireless handset and the entropy encoded version of the SDIP syntax element is received by the receiver and modulated according to a wireless communication standard.

* * * * *